Z. NICHOLSON.
Improvement in Wire-Fences.

No. 114,029. Patented April 25, 1871.

Witnesses:
A. W. Almqvist
Wm. H. C. Smith

Inventor:
Z. Nicholson
per Wmm /C
Attorneys.

UNITED STATES PATENT OFFICE.

ZEBEDEE NICHOLSON, OF HADDONFIELD, NEW JERSEY.

IMPROVEMENT IN WIRE FENCES.

Specification forming part of Letters Patent No. 114,029, dated April 25, 1871.

*To all whom it may concern:*

Be it known that I, ZEBEDEE NICHOLSON, of Haddonfield, in the county of Camden and State of New Jersey, have invented a new and useful Improvement in Wire Fence; and I do hereby declare that the following is a full, clear, and exact description thereof, which will enable others skilled in the art to make and use the same, reference being had to the accompanying drawing, forming part of this specification.

This invention relates to a new and useful improvement in wire fences for farm-inclosures and other purposes; and consists in the mode of arranging and securing the wire in the posts, and in tying or securing the wires together between the posts, as will be hereinafter more fully described.

Figure 1:
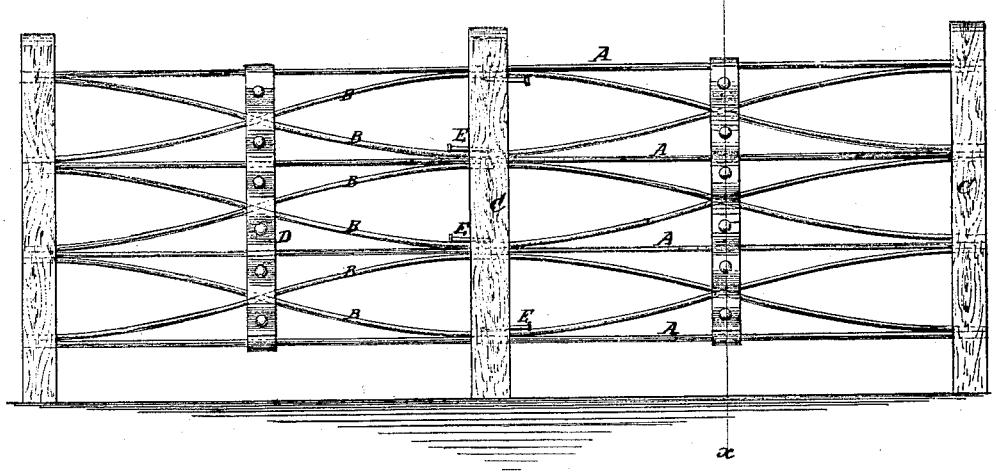
Figure 2:

In the accompanying drawing, Figure 1 represents a front elevation, and Fig. 2 a vertical section of Fig. 1 on the line $x\ x$, of a frame constructed according to my invention.

Similar letters of reference indicate corresponding parts.

This fence is formed of a series of straight strands of wire, (four, more or less, marked A,) a series of curved wires, (six, more or less, marked B,) in combination with the posts C and stiffener D.

All the wires pass through the posts, where two or more of each series are grouped together and securely fastened by the keys E, as represented in the drawing.

The stiffener D is placed midway between each pair of posts, consisting of a plate on each side of the fence, the two plates being riveted together, so as to securely hold the wires and make them mutually self-supporting. The stiffener may be made of a single piece, doubled over the upper and under wires.

The common objection to wire fences is, especially for door-yards, that the fence is unsightly, and that the wires between the posts are too loose, and the general appearance of the fence is open and insecure.

By my arrangement of the wires or mode of grouping them, and connecting them so as to make them support each other, these objections are, in a great measure, obviated.

Having thus described my invention, I claim as new and desire to secure by Letters Patent—

1. The arrangement of the wires A and B, substantially as and for the purposes shown and described.

2. In combination with the wires A B, arranged as shown, the stiffener D, substantially as and for the purposes shown and described.

The above specification of my invention signed by me this 4th day of March, 1871.

ZEBEDEE NICHOLSON.

Witnesses:
GEO. W. MABEE,
ALEX. F. ROBERTS.